Nov. 15, 1927.
W. H. WHEATLEY
1,649,631
MILLING CUTTER FOR HELICAL OR SPIRAL AND STRAIGHT BEVEL GEARS
Filed Jan. 19, 1925
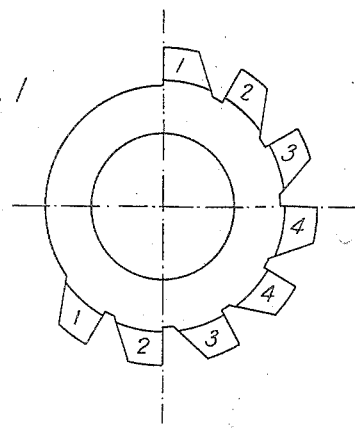
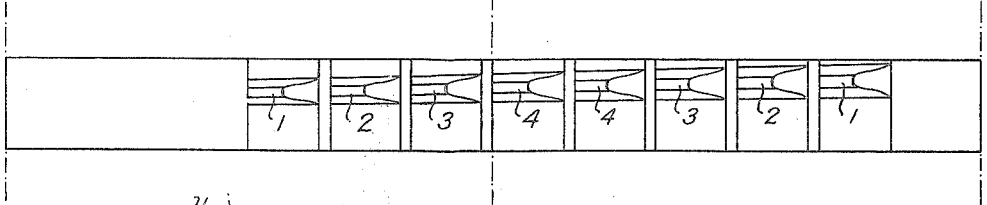
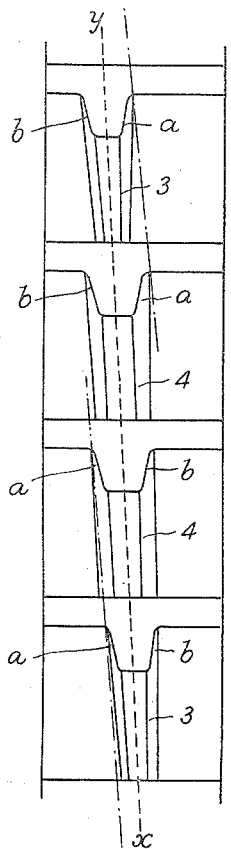
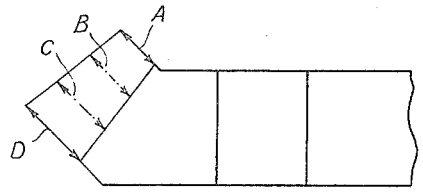
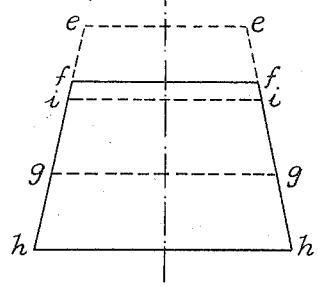
Inventor
Walter Harry Wheatley
By
Attorney Patented Nov. 15, 1927.

1,649,631

UNITED STATES PATENT OFFICE.

WALTER HARRY WHEATLEY, OF LONDON, ENGLAND.

MILLING CUTTER FOR HELICAL OR SPIRAL AND STRAIGHT BEVEL GEARS.

Application filed January 19, 1925, Serial No. 3,395, and in Great Britain January 22, 1924.

This invention relates to the cutting of helical or spiral and straight bevel gears.

The object of the invention is to provide a rotary cutter which can be used in a universal milling machine, hobbing machine or other suitable machine and which is adapted to cut helical or spiral and straight bevel gears having teeth of involute or other form and in a single continuous operation.

According to the invention the rotary cutter comprises a series of cutting teeth arranged in a helical path, the teeth being arranged to co-operate in pairs, each pair being shaped to cut to correct shape the opposite sides of the groove between a pair of teeth at a particular point in the length of the groove.

The teeth are so formed and spaced as to permit each pair to fulfill its particular function without interference from the other pairs.

In operation the conical or other blank is mounted at a suitable angle in the machine and in all cases is continuously rotated at such a rate that any point on its surface travels through a distance equal to the pitch of one tooth at that particular point, whilst the helical cutter makes one revolution, and whilst the blank is rotating and the cutter is revolving in the manner just described, the cutter is fed at a sufficiently slow uniform rate in a direction perpendicular to its axis continuously across the blank, the axis moving in a plane so inclined to the axis of the blank that the outer tips of the teeth of the cutter during their action make contact with the surface on which the bottoms of the grooves between the teeth lie. As an alternative, the blank may be fed across the cutter.

With this mode of operation, the cutter successively cuts portions of all the grooves in the wheel to their full depth as it is fed across and completes the cutting of the wheel by being fed once across the blank. The blank makes a large number of revolutions while the revolving cutter is fed across it, the cutter being fed only a suitable minute distance whilst the blank makes one revolution.

If the axis of the blank is at right angles to the axis of the cutter, straight bevel teeth are cut and if the axis of the blank is inclined to the axis of the cutter, spiral or helical teeth are cut.

To enable the invention to be fully understood it will now be described by reference to the accompanying drawings in which:—

Fig. 1 is a side elevation of a cutter constructed according to the invention, and Fig. 2 is a front view thereof.

Fig. 3 shows a development of the surface of the cutter shown in Fig. 1, showing the position of the teeth;

Fig. 4 shows a bevel wheel with one tooth illustrating the points of the tooth or groove which corresponding teeth of the cutter are adapted to form correctly;

Fig. 5 is an enlarged view of a development of a portion of the surface of the cutter bearing two pairs of teeth;

Fig. 6 is a diagram illustrating a modification.

As shown in the drawings, the cutter comprises a series of eight equally spaced teeth working in pairs 1, 1, 2, 2, 3, 3, 4, 4. Each tooth has a cutting edge on one side only, the cutting edge of each tooth of a pair being on opposite sides of the helical centre line of the teeth.

In cutting a bevel or other wheel the cutting edge of one of the central pair of teeth 4 will fit (or approximately fit) the surface of the tooth at the line A and the cutting edge of the other tooth 4 will fit (or approximately fit) the surface of a tooth on the opposite side of the groove on a line corresponding to A.

Similarly the cutting edge on one of the teeth 3, 3 will fit (or approximately fit) the surface of the tooth on the line B and the cutting edge of the other tooth 3 will fit (or approximately fit) a line in a corresponding position on the opposite side of the groove.

Similarly the cutting edges of the pairs 2, 2 and 1, 1 fit (or approximately fit) at lines C and D on the tooth.

The lines A, B, C, D divide the length of the tooth into three equal parts and if more than four pairs of teeth are used they must fit at lines which similarly divide the length of the tooth into equal parts.

It will be noted that it is sufficient in the cutter shown in Fig. 1 to provide teeth for about two-thirds of its circumference only.

The helical pitch of the teeth of the cutter is preferably equal to the pitch of the teeth at the small end of the wheel to be cut, but it might be of less pitch.

For example (see Fig. 6) a cutter having the pitch of the end e, e of the cone h, h, e, e might be employed to cut teeth on a blank h, h, f, f, provided the teeth of the cutter were made to fit the teeth of the cone h, h, e, e, at the equal divisions e, e, i, i, g, g and h, h, in the manner explained in connection with Fig. 4.

The cutter may be made from a cylindrical steel blank having a hole to fit the cutter spindle. The blank is turned to a diameter equal to that between the tops of diametrically opposite cutting teeth, after which the gap shown in Figs. 1 and 2 is cut to a depth just below the bottom of the teeth and of the length required, say 1 quarter of the circumference. The spiral or helical thread is next turned or milled of a pitch equal to the pitch of the teeth at the small end of the bevel gear to be cut and of sufficient size to permit the cutting teeth to be formed from it. The thread is cut transversely to form the spaces shown in Fig. 1 between the teeth which preferably number 8 as shown in the drawings for small cutters, and 10 for larger cutters. The two opposite cutting edges $a$, $a$ on the pair of teeth 4, 4 are next formed to the correct shape for forming the sides of the teeth at the line A, Fig. 4, and the edges $b$ opposite the cutting edges and the back portions of the teeth are cut away or backed off to form a clearance and to prevent them from contacting with the sides of the groove being cut when the cutter is in action. The pair of teeth 3, 3 and the other pairs are formed in a similar manner with their cutting edges corresponding in shape, respectively, with the sides of the teeth at the lines B, C and D, Fig. 4.

As shown by dotted lines in Fig. 5, the cutting edges $a$ of the teeth 3, 3 are formed very slightly nearer to the helical axial line $x, y$ of the teeth than the cutting edges of the teeth 4, 4, in order that they may not contact with the portion of the groove finished by the teeth 4, 4, and the cutting edges of 2, 2 are slightly nearer to the axis than those of 3, 3 and the edges of 1, 1 slightly nearer than those of 2, 2.

In order to obtain the correct shape of the cutting edges of the teeth full size sections of a tooth of the wheel at the lines A, B, C, D, Fig. 4, may be drawn, and from these templates made to which the cutting edges may be fitted.

Having thus described the nature of my said invention and the best means I know of carrying the same into practical effect, I claim:—

1. A rotary cutter for cutting helical, spiral or straight bevel gears comprising a series of cutting teeth arranged on a body in a helical path and adapted to co-operate in pairs, each pair being shaped to cut to correct shape the opposite sides of the groove between a pair of teeth at a particular point in the length of the groove.

2. A rotary cutter for cutting helical, spiral or straight bevel gears comprising a series of cutting teeth arranged on a body in a helical path and adapted to co-operate in pairs in which the cutting edges of the central pair of teeth fit the sides of the groove at its smaller end and the outer pair of cutting edges fit the sides of the groove at its larger end, the intermediate pairs of cutting edges fitting the sides of the groove at intermediate points.

3. A rotary cutter for cutting helical, spiral or straight bevel gears comprising a series of cutting teeth arranged on a body in a helical path and adapted to co-operate in pairs in which the cutting edges of the central pair of teeth fit the sides of the groove at its smaller end and the outer pair of cutting edges fit the sides of the groove at its larger end, the intermediate pairs of cutting edges fitting the sides of the groove at intermediate points, the body having a circumferential portion not provided with teeth.

4. A rotary cutter comprising a series of cutting teeth arranged on a body in a helical path which is determined with reference to the advancing movement of the gear blank during continuous rotation of the blank and cutter while the plane and axial position of the cutter are maintained in fixed relation to the blank, whereby all the teeth of a helical, spiral or straight bevel gear may be cut in a single continuous operation by relatively feeding the rotating blank and cutter.

In testimony whereof I have signed my name to this specification.

WALTER HARRY WHEATLEY.